US009832549B2

(12) United States Patent
Greene et al.

(10) Patent No.: US 9,832,549 B2
(45) Date of Patent: Nov. 28, 2017

(54) SYSTEM, METHOD, AND APPARATUS FOR SUBSEA OPTICAL TO ELECTRICAL DISTRIBUTION

(71) Applicant: Teledyne Instruments, Inc., Thousand Oaks, CA (US)

(72) Inventors: Michael Greene, Palm Bay, FL (US); Huijiang Xi, Maitland, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 15/069,644

(22) Filed: Mar. 14, 2016

(65) Prior Publication Data

US 2017/0264980 A1   Sep. 14, 2017

(51) Int. Cl.
*H04Q 11/00* (2006.01)
*H04L 12/931* (2013.01)
*H04B 10/25* (2013.01)

(52) U.S. Cl.
CPC ..... *H04Q 11/0003* (2013.01); *H04B 10/2504* (2013.01); *H04L 49/351* (2013.01)

(58) Field of Classification Search
CPC combination set(s) only.
See application file for complete search history.

(56) References Cited

U.S. PATENT DOCUMENTS

| | | | |
|---|---|---|---|
| 8,734,026 B2 | 5/2014 | Nagengast et al. | |
| 2004/0262008 A1 | 12/2004 | Deans et al. | |
| 2007/0107903 A1 | 5/2007 | Baggs | |
| 2010/0008371 A1 | 1/2010 | Brekke et al. | |
| 2010/0020813 A1 | 1/2010 | Brekke et al. | |
| 2010/0156662 A1 | 6/2010 | Davis | |
| 2012/0120963 A1 | 5/2012 | Davis | |
| 2012/0175122 A1* | 7/2012 | Simpson | E04B 1/6112 166/335 |
| 2014/0093247 A1* | 4/2014 | Jamtveit | F16L 1/12 398/104 |
| 2014/0153159 A1* | 6/2014 | Hazel | H02J 1/08 361/602 |
| 2016/0177700 A1* | 6/2016 | Scott | E21B 47/0001 340/850 |
| 2016/0308639 A1* | 10/2016 | Zhang | H04J 14/0204 |

* cited by examiner

*Primary Examiner* — David Payne
*Assistant Examiner* — Omar S Ismail
(74) *Attorney, Agent, or Firm* — Duncan Galloway Egan Greenwald, PLLC; Kevin T. Duncan

(57) ABSTRACT

The present invention provides systems, methods, and apparatuses for subsea optical to electrical distribution. The present invention comprises one or more routing units adapted to convert optical signals to electrical signals and route the converted electrical signals to an appropriate end device. The routing unit is a compact device that may be installed without the use of heavy equipment.

21 Claims, 9 Drawing Sheets

SYSTEM, METHOD, AND APPARATUS FOR SUBSEA OPTICAL TO ELECTRICAL DISTRIBUTION

FIELD OF THE INVENTION

The present invention relates generally to subsea communications networks. Specifically, the present invention relates to the conversion, routing, and management of communications signals between devices and equipment on the sea floor involved in the process of subsea hydrocarbon extraction.

BACKGROUND OF THE INVENTION

In offshore drilling and production operations, equipment are often subjected to harsh conditions thousands of feet under the sea surface with working temperatures of −50° F. to 350° F. with pressures of up to 15,000 psi. Subsea control and monitoring equipment commonly are used in connection with operations concerning the flow of fluid, typically oil or gas, out of a well. Flow lines are connected between subsea wells and production facilities, such as a floating platform or a storage ship or barge. Subsea equipment include sensors and monitoring devices (such as pressure, temperature, corrosion, erosion, sand detection, flow rate, flow composition, valve and choke position feedback), and additional connection points for devices such as down hole pressure and temperature transducers. A typical control system monitors, measures, and responds based on sensor inputs and outputs control signals to control subsea devices. For example, a control system attached to a subsea tree controls down-hole safety valves. Functional and operational requirements of subsea equipment have become increasingly complex along with the sensing and monitoring equipment and control systems used to insure proper operation.

To connect the numerous and various sensing, monitoring and control equipment necessary to operate subsea equipment, harsh-environment connectors are used with electrical cables, optical fiber cables, or hybrid electro-optical cables. Initial demand for subsea connector development was in connection with military applications. Over time demand for such connectors has grown in connection with offshore oil industry applications. There exists a variety of wet-mate and dry-mate electrical and optical connectors that may be employed in subsea communication systems. In some known underwater electrical connectors, such as that described in U.S. Pat. Nos. 4,795,359 and 5,194,012 of Cairns, which are incorporated herein by reference in their entirety, tubular socket contacts are provided in the receptacle unit, and spring-biased pistons are urged into sealing engagement with the open ends of the socket assemblies. Examples of prior pressure compensated wet-mate devices are described in U.S. Pat. Nos. 4,616,900; 4,682,848; 5,838,857; 6,315,461; 6,736,545; and 7,695,301, each of which is incorporated by reference herein in their entirety. U.S. Pat. No. 4,666,242 of Cairns, which is incorporated herein by reference in its entirety, describes an underwater electro-optical connector in which the male and female connector units are both oil filled and pressure balanced. Other known seal mechanisms involve some type of rotating seal element along with an actuator for rotating the seal element between a closed, sealed position when the units are unmated, and an open position when the units are mated, allowing the contact probes to pass through the seal elements into the contact chambers. Such connectors are described, for example, in U.S. Pat. Nos. 5,685,727 and 5,738,535 of Cairns, which are incorporated by reference herein in their entirety.

To facilitate communication between these underwater devices, and between different communication mediums and network types, systems and control device are employed to manage the subsea equipment. Subsea communication may be implemented by fiber optic, electrical, or hybrid optical-electric communication systems. Fiber optic communication systems typically employ one or more optical fibers, while electrical communication systems employ copper wire which may be implemented as a twisted pair. Communication between devices and pieces of equipment may be on a TCP/IP network and may be handled by one or more modems, switches, routers, and control apparatuses. In a typical subsea communication network having a plurality of wellheads a large subsea router module, such as those manufactured by FMC Technologies or General Electric Oil & Gas, is employed to manage and facilitate communications between one or more subsea devices and other equipment on the surface. For example, an oil platform may have an umbilical that connects equipment on the surface at the oil platform to subsea equipment and that terminates at an umbilical termination head. The umbilical termination head will then have one or more leads that connect data lines from the umbilical to a subsea router module. The large subsea router module then facilitates communication between the surface and other subsea equipment such as wellheads, distribution units, and monitoring equipment. The subsea routing module, in some implementations, may also be configured to transform or convert signals from one form to another to facilitate communications between a plurality of subsea devices. For example, the subsea router module may be configured to convert optical input signals into electrical output signals or convert electrical input signals into optical output signals.

The primary issue with subsea router modules is that the modules are large and expensive. Additionally, even though the modules may provide a form of internal redundancy for subsea device connections, these modules are prone to single points of failure from loss of power, pressure loss, or leaks. For example, a subsea router module may have 3 redundant systems for communicating with a set of wellheads, but if the atmospheric chamber in which the systems are located experiences a leak or pressure failure, all of the redundant systems will fail simultaneously. Furthermore, installing a subsea router module is time consuming and expensive. The subsea router module is a large piece of equipment that must be lowered to the sea floor by a crane or similar apparatus suitable for installing large, heavy equipment. The router module is also difficult to service and maintain once it has been installed subsea. The difficulties in installing and maintaining a subsea router module cause the subsea router module to be a costly piece of equipment to implement.

The subsea router module is also not particularly well suited to every type of subsea equipment configuration. The subsea router module may offer some advantages when used with a larger number, e.g. eight or more, wellheads or wellhead trees that are spaced large distances from the umbilical termination head, oil platform, or other surface equipment. However, when a configuration employs a smaller number of wellheads that are in closer physical proximity to the umbilical termination head or surface equipment, the subsea router module is not the ideal choice for routing and subsea communications.

What is needed is a more flexible, redundant, and inexpensive alternative to large subsea router modules. Preferably, the alternative will be able to be installed by a remote operated vehicle (ROV) without the need for a large crane to lower the device to the sea floor. Additionally, the device should be able to manage communications switching and routing in addition to signal conversion. The device should be small and easily movable and replaceable when needed.

SUMMARY OF THE INVENTION

The present invention provides a system, method, and apparatus for subsea optical to electrical distribution. The present invention may take the form of a flying lead harness or modular connectorized distribution unit housing (MCDU), such as that disclosed in MODULAR SECURING DEVICE FOR ROV AND DIVER MATE-ABLE SUBSEA APPLICATIONS, U.S. patent application Ser. No. 14/582,165, which is hereby incorporated by reference in its entirety, and may comprise at least one optical signal input and a plurality of electrical outputs. The present invention provides for fiber optic Ethernet to communicate via an Ethernet network, e.g. TCP/IP, to a set of other Ethernet devices via copper connections. The present invention provides a far more economical system, apparatus, and method for connecting multiple pieces of subsea equipment to an umbilical via Ethernet when the pieces of equipment are located in a close physical proximity to the umbilical termination head.

The present invention enables the connection of optical Ethernet directly to electrical Ethernet equipment without the requirement of a large subsea router module. The present invention converts the optical signal to electrical Ethernet signals and synchronizes multiple subsea devices together. The present invention may be configured by a local configuration microcontroller, a junction box, a distribution unit, or by surface equipment.

The present invention improves on prior art subsea router modules and signal conversion devices. The present invention enables the connection of one or more fiber lines to a plurality of copper lines. In one embodiment, the invention has a single optical fiber line as an input and four copper electrical Ethernet lines as outputs. All connected lines can be connected and communicating simultaneously. An additional fiber line may be added for additional redundancy. The copper lines enable communication with one or more subsea devices or equipment.

In one embodiment the present invention provides a compact subsea Ethernet switching transmission system comprising: at least one subsea optical or electro-optical cable having first and second ends; a plurality of electrical Ethernet cables; a source device; a plurality of end devices; and at least one subsea electro-optical routing unit having a first end connected to the first end of the optical or electro-optical cable and a second end connected to one end of the electrical cable, the routing unit having a compact subsea housing containing an atmospheric chamber and an Ethernet switching or routing device mounted in the atmospheric chamber; the Ethernet switching or routing device comprising: at least one optical input/output junction; a plurality of electrical input/output junctions; an Ethernet switching controller; a configuration micro-controller; and a multi-directional electrical/optical converter module operatively disposed between the optical input/output junction and the Ethernet switching controller, the converter module configured to convert optical input signals received at the optical input/output junction into electrical output signals at the Ethernet switching controller, and to convert electrical input signals received from the Ethernet switching controller into optical output signals at the optical input/output junction; wherein the configuration of the Ethernet switching controller is determined by the configuration micro-controller; one or more signal-carrying optical fibers extending from the first end of the optical or electro-optical cable into the atmospheric chamber of the first end of the routing unit and connected to the first junction of the multi-directional electrical/optical converter module, the optical or electro-optical cable releaseably connected to the subsea electro-optical routing unit; and a plurality of electrical signal wires or conductors extending from the second junction and communicating with corresponding electrical signal wires in the plurality of electrical Ethernet cables, the plurality of electrical Ethernet cables releaseably connected to the subsea electro-optical routing unit; wherein the subsea electro-optical routing unit is disposed between and is in operative electrical communication with the at least one subsea optical or electro-optical cable and the plurality of Ethernet cables; and wherein the second end of the optical or electro-optical cable is releaseably connected to the source device, and wherein each of the plurality of electrical Ethernet cables are releaseably and operatively connected an end device from the plurality of end devices.

The system of the above embodiment may further comprise wherein the source device is an umbilical termination and the plurality of end devices comprise at least one well tree. The system may further comprise wherein monitoring of the transmission system and of the source device and the plurality of end devices is performed by a set of surface based equipment. The housing may be selected from the group consisting of a flying lead housing and a modular connectorized distribution unit housing. The housing may further comprise an oil filled chamber separated from the atmospheric chamber by a set of penetrators.

In another embodiment the present invention provides a compact subsea Ethernet switching transmission apparatus comprising: at least one subsea optical or electro-optical cable having first and second ends; a plurality of electrical Ethernet cables; and at least one subsea electro-optical routing unit having a first end connected to the first end of the optical or electro-optical cable and a second end connected to one end of the electrical cable, the routing unit having a compact subsea housing containing an atmospheric chamber and an Ethernet switching or routing device mounted in the atmospheric chamber; the Ethernet switching or routing device comprising: at least one optical input/output junction; a plurality of electrical input/output junctions; an Ethernet switching controller; a configuration micro-controller; and a multi-directional electrical/optical converter module operatively disposed between the optical input/output junction and the Ethernet switching controller, the converter module configured to convert optical input signals received at the optical input/output junction into electrical output signals at the Ethernet switching controller, and to convert electrical input signals received from the Ethernet switching controller into optical output signals at the optical input/output junction; wherein the configuration of the Ethernet switching controller is determined by the configuration micro-controller; one or more signal-carrying optical fibers extending from the first end of the optical or electro-optical cable into the atmospheric chamber of the first end of the routing unit and connected to the first junction of the multi-directional electrical/optical converter module, the optical or electro-optical cable releaseably connected to the subsea electro-optical routing unit; and a plurality of electrical signal wires or conductors extending from the second junction and communicating with corresponding electrical signal wires in the plurality of electrical Ethernet cables, the plurality of electrical Ethernet cables releaseably connected to the subsea electro-optical routing unit; wherein the subsea electro-optical routing unit is disposed between and is in operative electrical communication with the at least one subsea optical or electro-optical cable and the plurality of Ethernet cables.

The apparatus of the above embodiment may further be adapted to connect to a source device and a plurality of end devices. The source device may be an umbilical termination and the plurality of end devices comprise at least one well tree. The apparatus may be adapted to monitor a subsea Ethernet transmission system, the source device, and the plurality of end devices. The monitoring of the transmission system, the source device, and the plurality of end devices may be performed by a set of surface based equipment. The housing may be selected from the group consisting of a flying lead housing and a modular connectorized distribution unit housing. The housing may further comprise an oil filled chamber separated from the atmospheric chamber by a set of penetrators.

In yet another embodiment the present invention provides a method for subsea electro-optical Ethernet transmission between a source device and a plurality of end devices, the method comprising: releaseably connecting a first end of an optical or electro-optical cable to the source device; releaseably connecting a second end of the optical or electro-optical cable to an optical or electro-optical input/output port on a subsea electro-optical routing unit; releaseably connecting a first end of an electrical Ethernet cable to one of a plurality of electrical Ethernet input/output ports on the subsea electro-optical routing unit; releaseably connecting a second end of the electrical Ethernet cable to an end device; configuring an Ethernet switching controller disposed in the electro-optical routing unit by a configuration micro-controller; communicating a first optical signal from the source device to the optical input/output port of the electro-optical routing unit; converting, by an electrical/optical converter module, the first optical signal into a first electrical signal; communicating the first electrical signal from the electrical/optical converter module to the Ethernet switching controller; determining which of the plurality of electrical Ethernet input/output ports to communicate the first electrical signal to based on a current configuration of the Ethernet switching module; transmitting the first electrical signal to the end device by the electrical Ethernet cable connected to the determined electrical Ethernet input/output port; communicating a second electrical signal from the end device to an electrical Ethernet input/output port of the electro-optical routing unit by the electrical Ethernet cable connected to the electrical Ethernet input/output port; determining which of the plurality of electrical Ethernet input/output ports received the second electrical signal based on a current configuration of the Ethernet switching module and appending a set of source information to the second electrical signal; communicating the second electrical signal from the Ethernet switching controller to the electrical/optical converter module; converting, by the electrical/optical converter module, the second electrical signal into a second optical signal; and transmitting the optical signal to the source device by the optical or electro-optical cable.

The method of the above embodiment may further comprise wherein the source device is an umbilical termination and the plurality of end devices comprise at least one well tree. The method may further comprise monitoring, by the subsea electro-optical routing unit, a subsea Ethernet transmission system, the source device, and the plurality of end devices. The monitoring of the transmission system, the source device, and the plurality of end devices may be performed by a set of surface based equipment. The subsea electro-optical routing unit may comprise a housing selected from the group consisting of a flying lead housing and a modular connectorized distribution unit housing. The housing may further comprise an oil filled chamber separated from the atmospheric chamber by a set of penetrators.

In another embodiment, the present invention provides a compact subsea Ethernet switching transmission system comprising: at least one subsea optical or electro-optical cable having first and second ends; a plurality of transmission cables; a source device; a plurality of end devices; and at least one subsea electro-optical routing unit having a first end connected to the first end of the optical or electro-optical cable and a second end connected to one end of the optical or electro-electrical optical cable, the subsea electro-optical routing unit having a compact subsea housing containing an atmospheric chamber and an Ethernet switching or routing device mounted in the atmospheric chamber; the Ethernet switching or routing device comprising: at least one optical input/output junction; a plurality of electrical input/output junctions; an Ethernet switching controller; a configuration micro-controller for configuring the Ethernet switching controller; and a multi-directional electrical/optical converter module operatively disposed between the optical input/output junction and the Ethernet switching controller, the converter module configured to convert optical input signals received at the optical input/output junction into electrical output signals at the Ethernet switching controller, and to convert electrical input signals received from the Ethernet switching controller into optical output signals at the optical input/output junction; wherein the configuration of the Ethernet switching controller is determined by the configuration micro-controller; one or more signal-carrying optical fibers extending from the first end of the optical or electro-optical cable into the atmospheric chamber of the first end of the optical or electro-optical routing unit and connected to the first junction of the multi-directional electrical/optical converter module, the optical or electro-optical cable releaseably connected to the subsea electro-optical routing unit; and a plurality of electrical signal wires or conductors extending from the second junction and communicating with corresponding electrical signal wires in the plurality of cables via the Ethernet switching controller, the plurality of transmission cables releaseably connected to the subsea electro-optical routing unit.

In another embodiment, the present invention provides a compact subsea Ethernet switching transmission apparatus comprising: at least one subsea optical or electro-optical cable having first and second ends; a plurality of transmission cables; and at least one subsea electro-optical routing unit having a first end connected to the first end of the optical or electro-optical cable and a second end connected to one end of the optical or electrical electro-optical cable, the subsea electro-optical routing unit having a compact subsea housing containing an atmospheric chamber and an Ethernet switching or routing device mounted in the atmospheric chamber; the Ethernet switching or routing device comprising: at least one optical input/output junction; a plurality of electrical input/output junctions; an Ethernet switching controller; a configuration micro-controller for configuring the Ethernet switching controller; and a multi-directional electrical/optical converter module operatively disposed between the optical input/output junction and the Ethernet switching controller, the converter module configured to convert optical input signals received at the optical input/ output junction into electrical output signals at the Ethernet switching controller, and to convert electrical input signals received from the Ethernet switching controller into optical output signals at the optical input/output junction; wherein the configuration of the Ethernet switching controller is determined by the configuration micro-controller; one or more signal-carrying optical fibers extending from the first end of the optical or electro-optical cable into the atmospheric chamber of the first end of the subsea electro-optical routing unit and connected to the first junction of the multi-directional electrical/optical converter module, the optical or electro-optical cable releaseably connected to the subsea electro-optical routing unit; and a plurality of electrical signal wires or conductors extending from the second junction and communicating with corresponding electrical signal wires in the plurality of transmission cables, the plurality of transmission cables releaseably connected to the subsea electro-optical routing unit

BRIEF DESCRIPTION OF THE DRAWINGS

In order to facilitate a complete understanding of the present invention, this system, and the terms used, reference is now made to the accompanying drawings, in which like elements are referenced with like numerals. These drawings should not be construed as limiting the present invention or system, but are exemplary and for reference.

DETAILED DESCRIPTION

The present invention and system will now be described in more detail with reference to exemplary embodiments as shown in the accompanying drawings. While the present invention and system is described herein with reference to the exemplary embodiments, it should be understood that the present invention and system is not limited to such exemplary embodiments. Those possessing ordinary skill in the art and having access to the teachings herein will recognize additional implementations, modifications, and embodiments as well as other applications for use of the invention and system, which are fully contemplated herein as within the scope of the present invention and system as disclosed and claimed herein, and with respect to which the present invention and system could be of significant utility.

Figure 1:
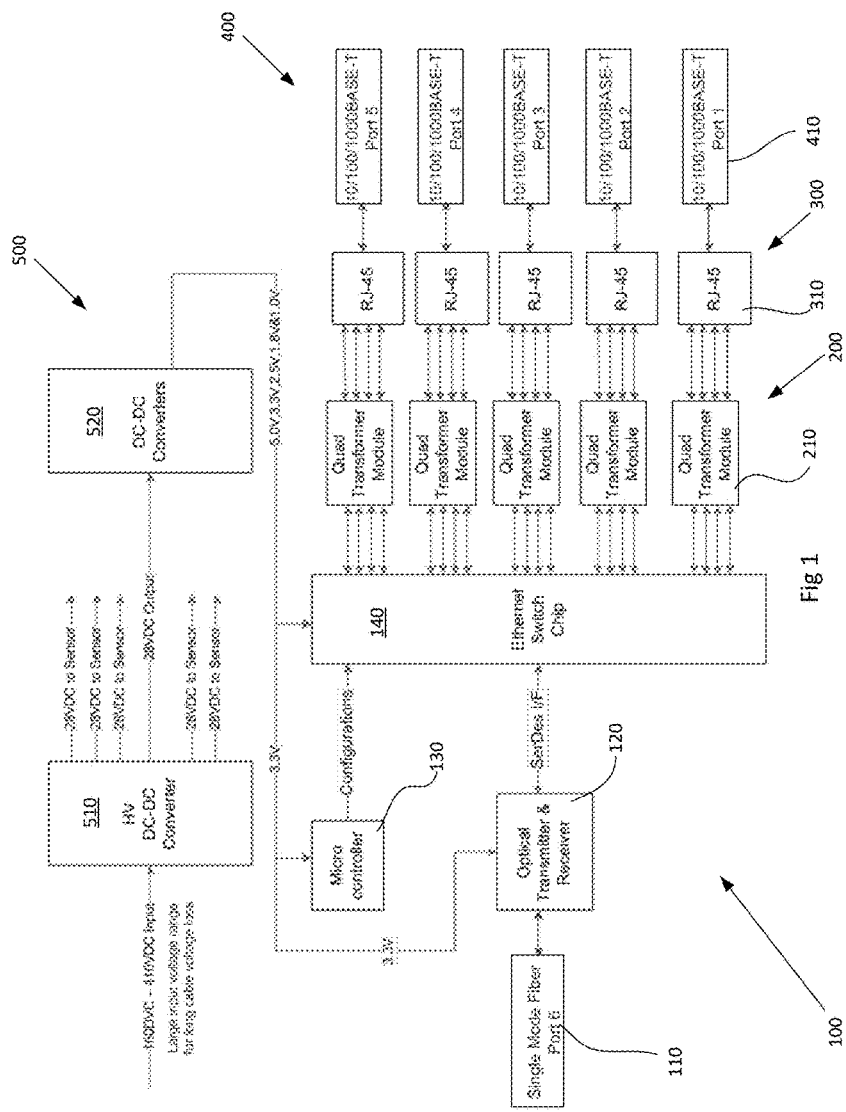
FIG. 1 provides a block circuit diagram showing the components that may comprise the routing unit according to one embodiment of the present invention.

With reference now to FIG. 1, a block circuit diagram showing the components comprising a routing unit 100 according to the present invention is provided. The routing unit 100 may comprise a single mode fiber port 110, an optical transmitter and receiver 120, a microcontroller 130, an Ethernet switch chip 140, a set of transformer modules 200, a set of RJ-45 connections 300, and a set of 10/100/1000BASE-T Ethernet ports 400. The routing unit 100 may also comprise a high voltage DC-DC converter 510 and a DC-DC converter 520. The set of transformer modules 200 may comprise a plurality of quad transformer modules 210. The set of RJ-45 connections 300 may comprise a plurality of RJ-45 connections 310. The set of 10/100/1000BASE-T Ethernet ports 400 may comprise a plurality of electrical Ethernet ports 210. The components comprising the routing unit 100 would be enclosed in a housing such as those shown in FIGS. 2 and 3. The high voltage DC-DC converter 510 and DC-DC converters 520 may not be in every embodiment of the router 100. However, if used, the high voltage DC-DC converter 510 would step down an input voltage of 150 VDC-410 VDC to 28 VDC. The DC-DC converter 520 would further reduce the voltage to 5.0V, 3.3V, 2.5V, 1.8V and 1.0V as required for the components of the router 100.

The micro controller 130 provides the current configuration for the Ethernet switch chip 140. The micro controller 130 may be pre-programmed at the time the router 100 is assembled or may be programmed once the router 100 is installed in a subsea communications network. The optical transmitter & receiver 120 converts optical signals from a source device such as an umbilical termination head to electrical signals and sends the electrical signals to the Ethernet switch chip 140. The correct quad transformer module 210 to send the electrical signal to is determined by the Ethernet switch chip 140 based on the current configuration from the micro controller 130. Once it is determined which quad transformer module 210, and by extension RJ-45 port 310 and Ethernet port 410, to send the electrical signal to, any additional information necessary for proper transmission is appended to the signal and the electrical signal is sent to an end device.

Figure 2:
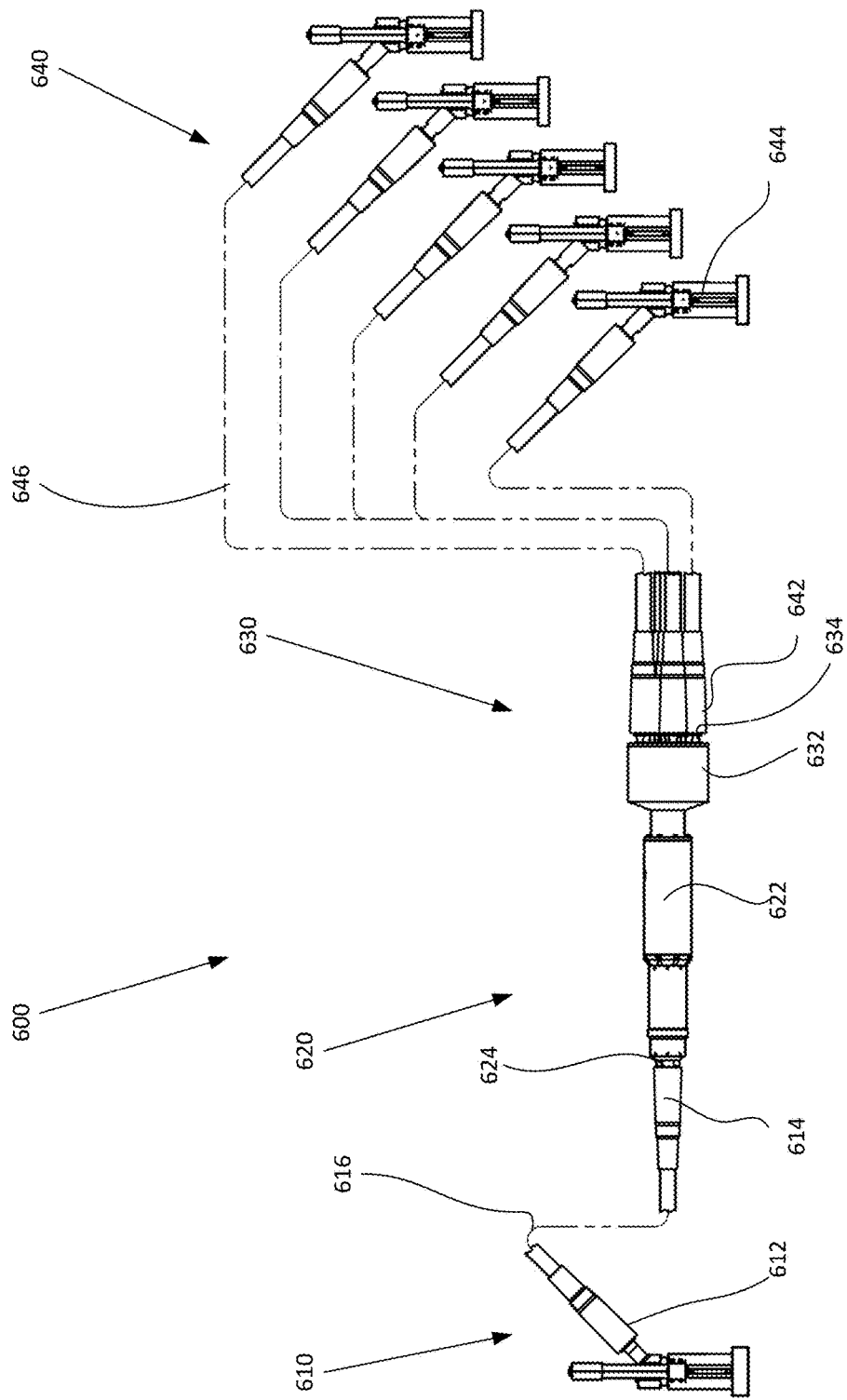
FIG. 2 provides a view of an embodiment of the routing unit of the present invention as a flying lead connecting a single optical lead to five electrical Ethernet leads.

With reference now to FIG. 2, a side view of flying lead harness 600 connecting an optical input cable 610 to five electrical Ethernet output cables 640 is provided. The first end 612 of the optical input cable 610 connects to a source device such as an umbilical termination. An optical cable 616, which may be a single mode optical fiber or a hybrid electro-optical cable, joins the first end 612 to the second end 614. The first end 612 and second end 614 of the optical cable 610 as well as the first end 642 and second end 644 of the electrical Ethernet cable 640, may be any suitable releasable wet-mate or dry-mate connector capable of functioning in a subsea environment and capable of withstanding high pressure and temperature differentials. The second end 614 of the optical cable 610 connects to the electro-optical input/output port 624. The electro-optical input/output port 624 is at one end of the router module housing 620. The router module housing 620 may comprise an atmospheric chamber 622 housing the circuits depicted in FIG. 1. A cable breakout 632 of the electrical distribution box 630 may comprise the set of Ethernet ports 400 shown in FIG. 1. Each cable 640 in the set of electrical Ethernet cables 640 connects to an electrical input/output junction 634 at the first end 642 of the electrical Ethernet cable 640. An electrical Ethernet wire 646 joins the first end 642 to the second end 644 of the electrical Ethernet cable and may connect to an end device such as a well tree.

Figure 3:
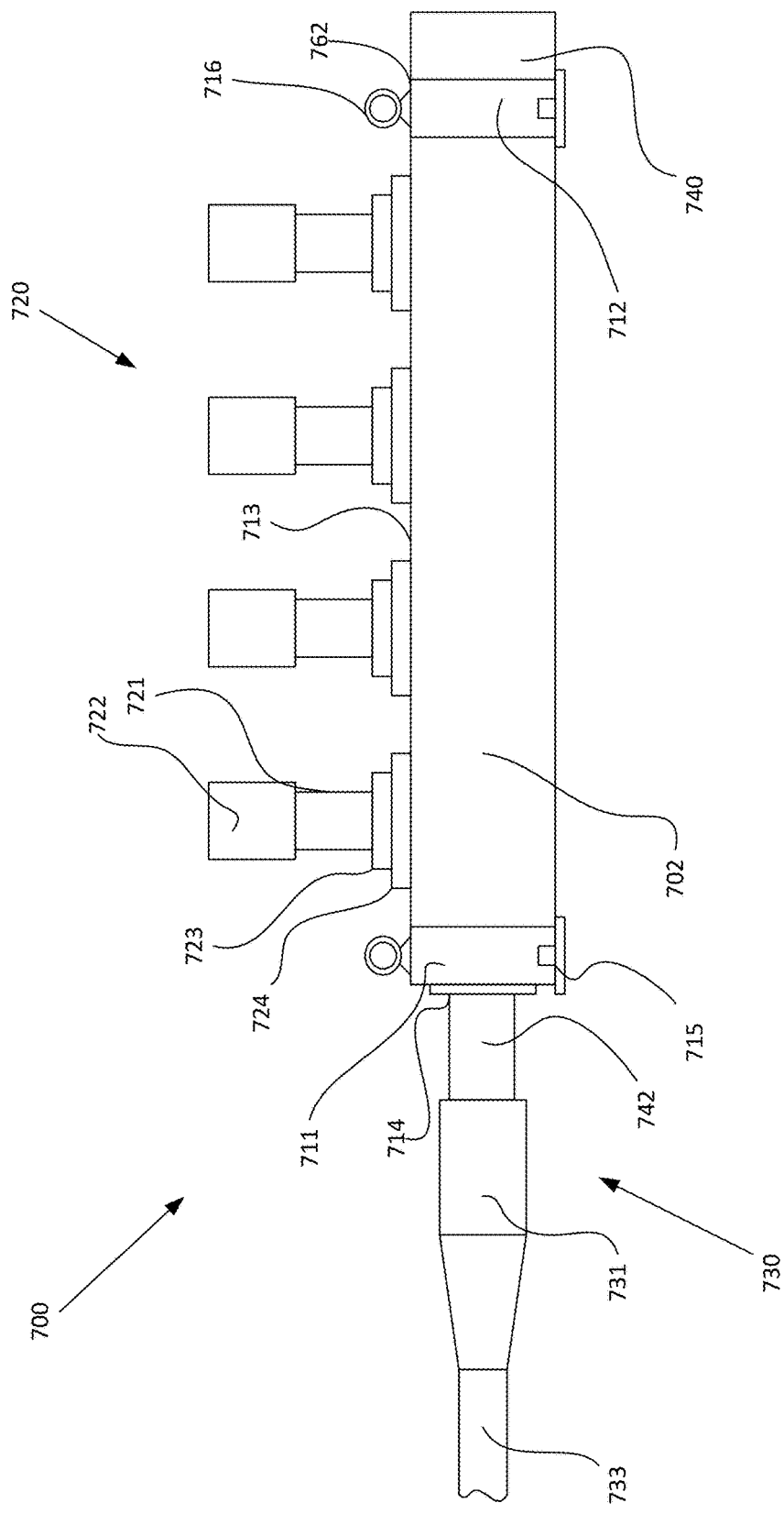
FIG. 3 provides a side view of an embodiment of the routing unit of the present invention as enclosed in an MCDU mountable housing and having a single optical input and a set of four electrical outputs.

With reference now to FIG. 3, a side view of an embodiment of a routing unit 700 in an MCDU housing 720 having an optical input port 742 and a plurality of electrical Ethernet output ports 722 is provided. The MCDU housing 720 may comprise first frame end 711 and second frame end 712 and have a body 702 and a top 713. Rings 716 with ring bases 762 may be used to secure the first frame end 711 and second frame end 712 to the body 702 or to move and maneuver the MCDU housing 720. A set of mounting points 715 may be used to secure the MCDU housing 720 to a larger structure or supporting surface. An optical cable 730 having a cable 733 and connection end 731 is adapted to connect to the optical input port 742. A collar 714 forms a seal between the optical input port 714 and the body 702 of the MCDU housing 720. Each optical input port 722 has a body 721, base 723, and seal 724 and is disposed on the top 713 of the body 702 of the MCDU housing 720. A circuit housing 740 may be disposed on the end of the body 702 of the MCDU housing 720 and may comprise an atmospheric chamber holding the circuit 100 described in FIG. 1.

In either the configuration shown in FIG. 2 or in FIG. 3, the routing device of the present invention is a small, compact, self contained device that may be easily installed in a subsea communications network without the use of a crane or other large surface equipment. Both configurations are installable by a diver or by an ROV and do not require heavy machinery or equipment to connect and place. The small size and easy installation of the routing device of the present invention provides for cost and time savings over the large subsea routing modules, such as subsea routing module 820 shown in FIG. 4, that are currently in use.

Figure 4:
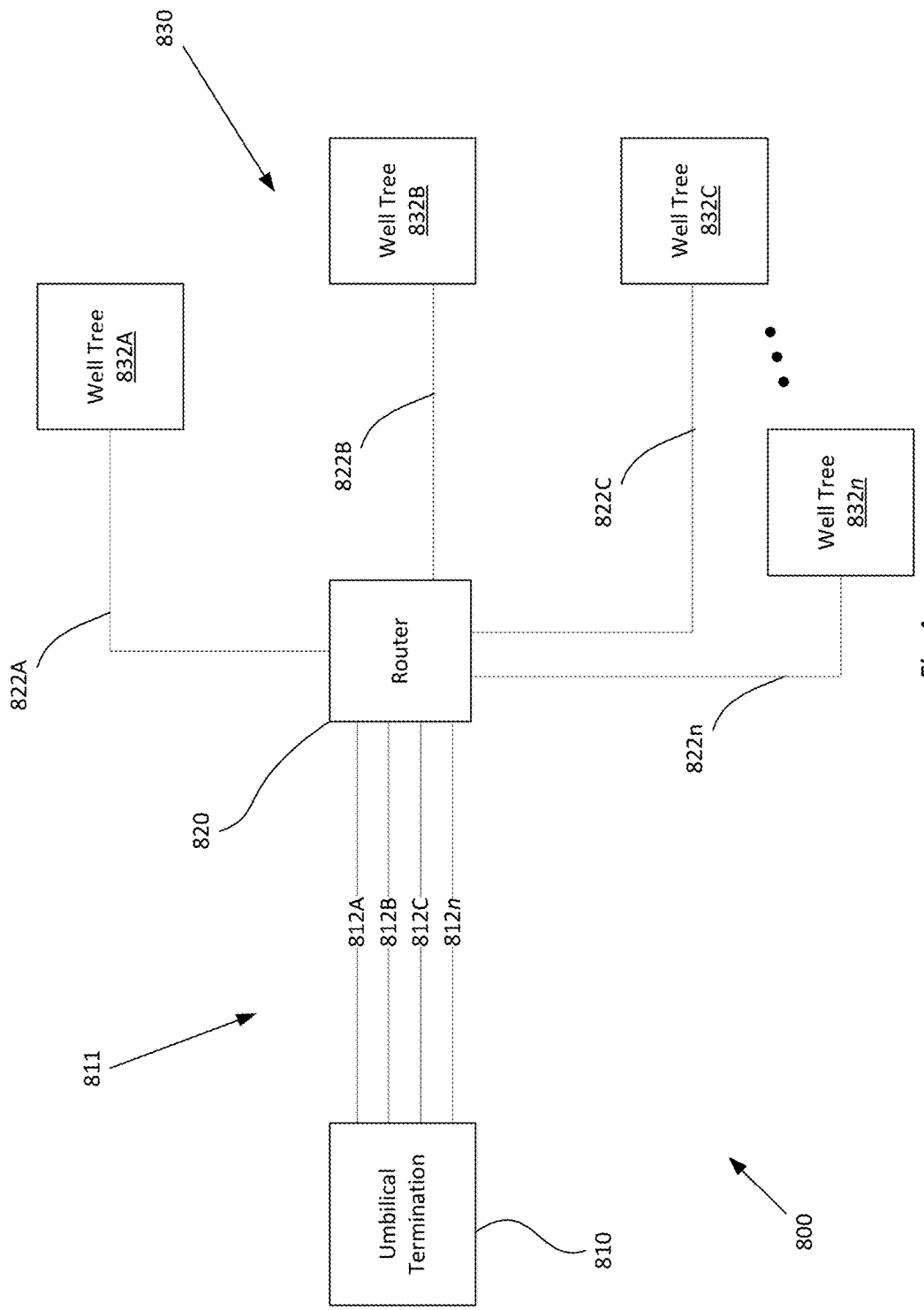
FIG. 4 provides a block diagram illustration of a prior art subsea communication system utilizing a subsea router module to facilitate communications between an umbilical termination an a set of well trees.

With reference now to FIG. 4, a block diagram of a prior art subsea communications system 800 is provided. The system 800 comprises an umbilical termination 810, a router 820, and a set of end devices 830 comprising well trees 832A, 832B, 832C through 832n. The umbilical termination 810 is the source device that connects to an umbilical that would extend to equipment on the surface. Alternatively, the umbilical termination 810 may be another source device capable of sending out an managing electronic communications. The router 820 functions to route and manage communications between the umbilical termination 810 and each well tree 832A, 832B, 832C through 832n that comprises the set of end devices 830. The set of end devices 830 may also be any other end device used in the subsea extraction of hydrocarbons or minerals. A set of optical connections 811 comprising connections 812A, 812B, 812C, through 812n connects the router 820 to the umbilical termination 810, and a set of electrical Ethernet connections 822 comprising connections 822A, 822B, 822C, through 822n connect each of corresponding well trees 832A, 832B, 832C through 832n to the router 820. The router 820 may also comprise equipment for performing diagnostics of the subsea communications system 800 and for monitoring other conditions of the pieces of equipment that comprise the system 800.

This prior art system 800 suffers from several drawbacks. First, it is an optimal configuration for subsea hydrocarbon extraction operations comprising only a few end devices 830 located in close physical proximity to both one another and to the umbilical termination 810. Installing a router 820 is a costly and expensive operation and the router itself is not optimized for operations comprising only a few end devices 830. The prior art system 800 is not a cost effective solution for an operation having a small number of five or fewer end devices 830 located close to one another and to the umbilical termination 810.

Figure 5:
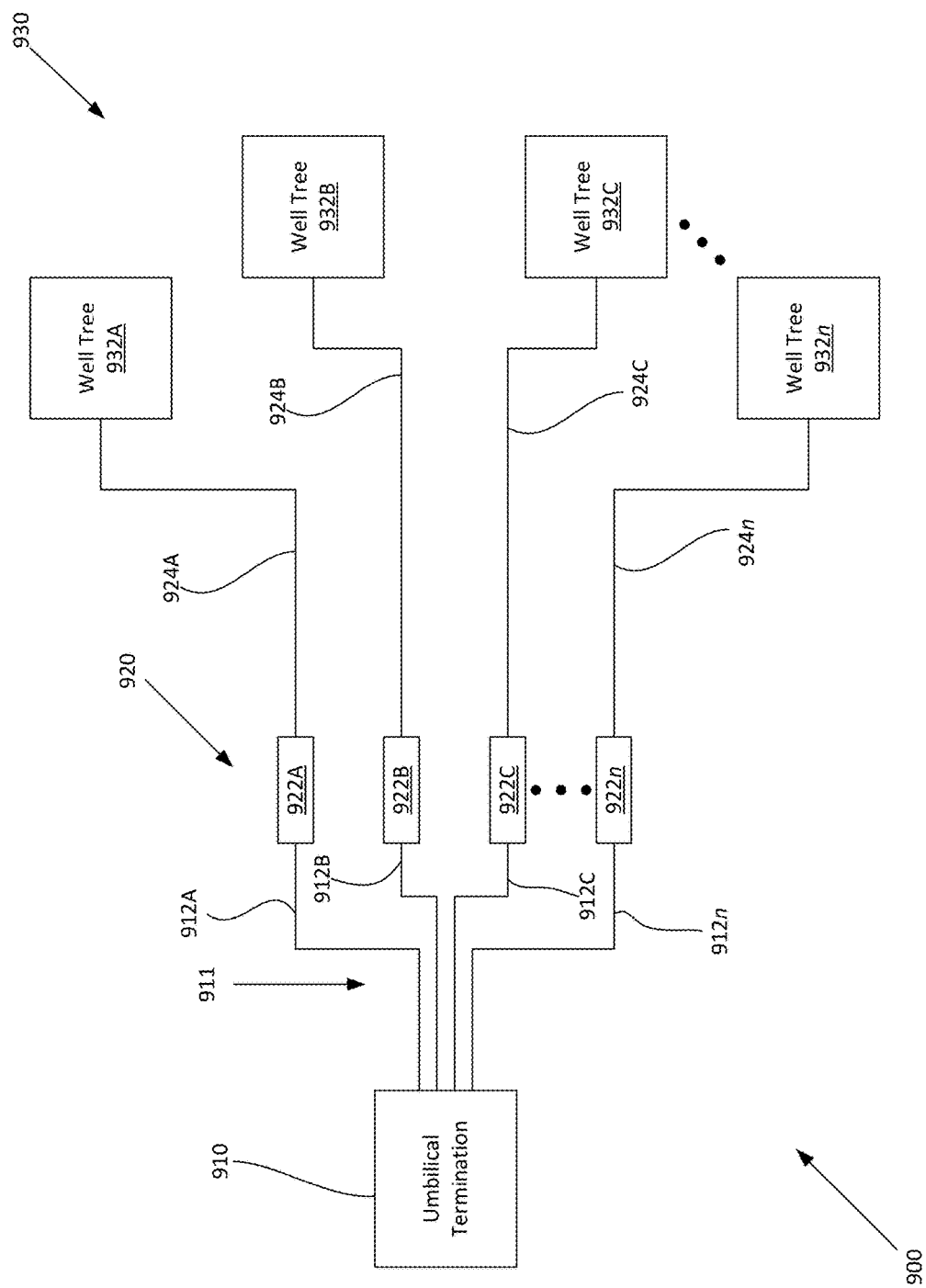
FIG. 5 provides a block diagram illustration of the routing unit of the present invention in a configuration wherein each well tree is connected to an umbilical termination by a separate routing unit.
Figure 6:
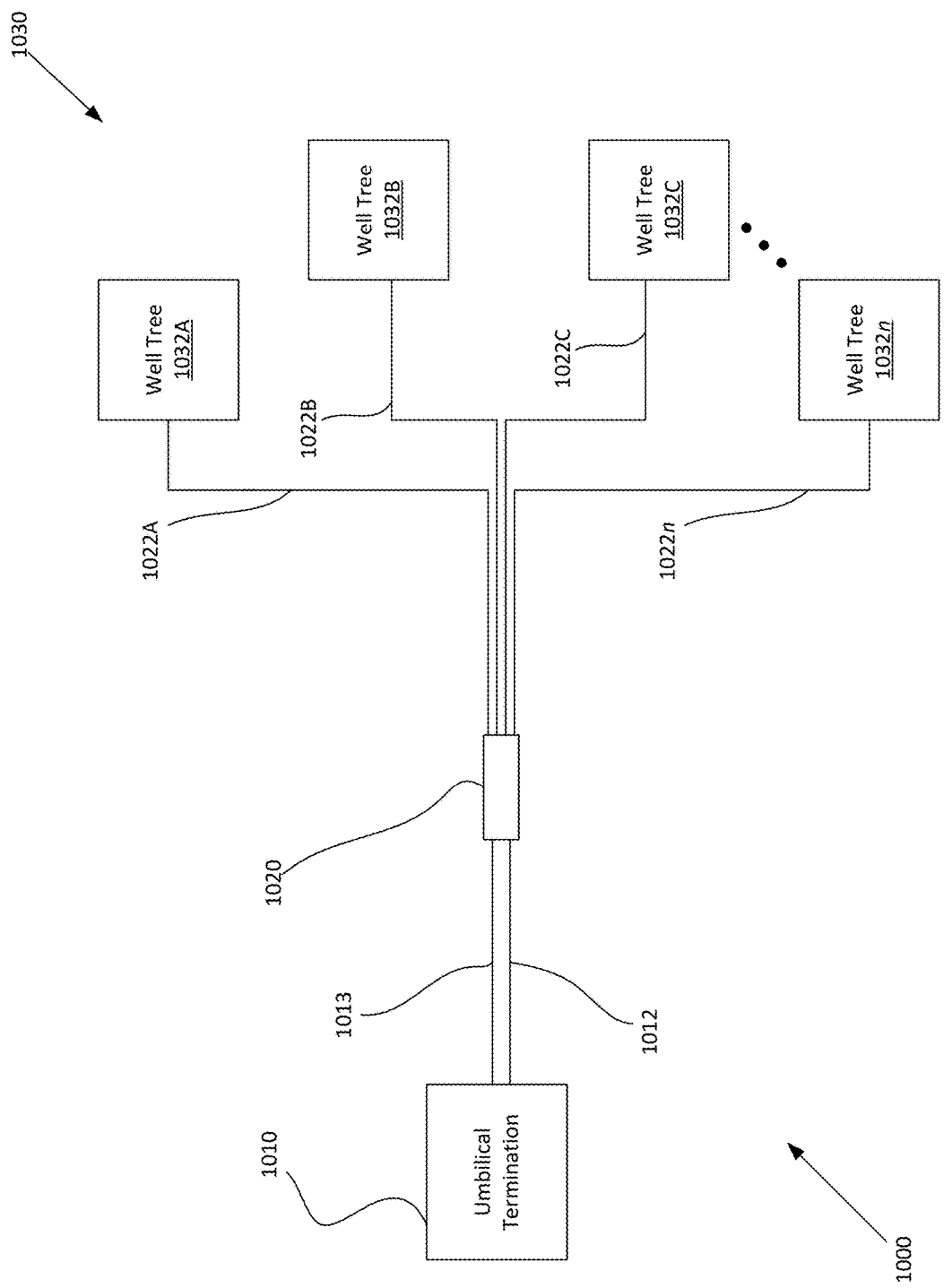
FIG. 6 provides a block diagram illustration of the routing unit of the present invention in a configuration wherein a single routing unit is connected to an umbilical termination by a plurality of optical leads and is connected to each of a set of well trees.
Figure 7:
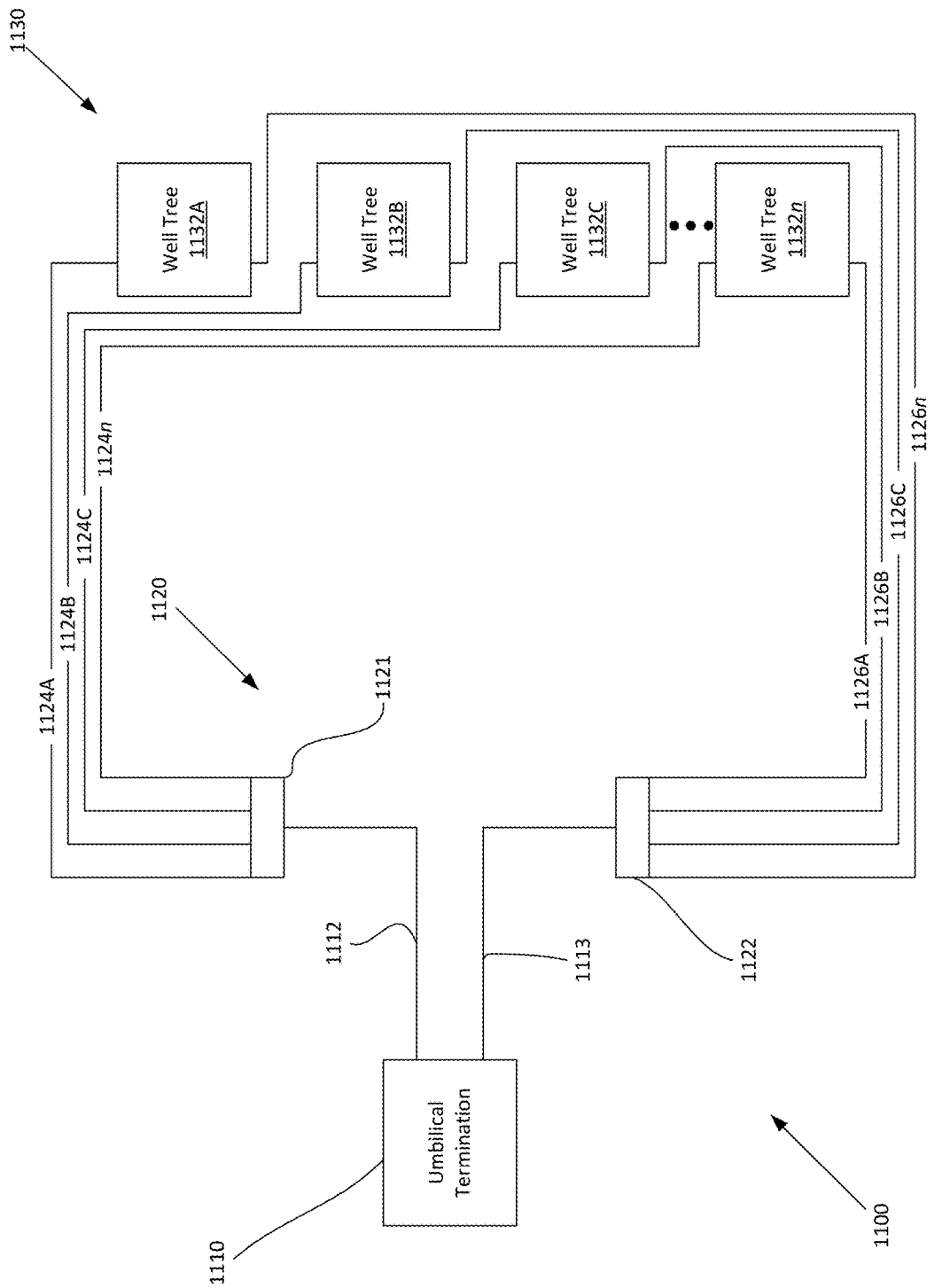
FIG. 7 provides a block diagram illustration of the routing unit of the present invention in a configuration wherein each of two routing units is connected to an umbilical termination by a single optical lead and wherein each of the two routing units are connected to each of a set of well trees.

With reference now to FIGS. 5-7, block diagrams of the routing unit of the present invention in various configuration are provided. It should be understood by a person of ordinary skill in the art that the routing unit of the present invention may be employed in any of these configurations or in another configuration that combines elements shown in the configurations of FIGS. 5-7. It should also be understood that while the source and end devices in FIGS. 5-7 are shown as specific devices, any devices used in subsea communications networks may be used in each communications network.

With reference first to FIG. 5, a block diagram of a subsea communications system 900 configuration wherein each well tree 932A, 932B, 932C, through 932n in the set of end devices 930 is connected to an umbilical termination 910 by a separate corresponding routing unit 922A, 922B, 922C, through 922n in the set of routing units 920 is provided. In this configuration, each routing unit 922A, 922B, 922C, through 922n in the set of routing units 920 is connected to the umbilical termination 910 by a corresponding optical or electro-optical cable 912A, 912B, 912C, through 912n in the set of optical or electro-optical cables 911. The set of routing units 920 serves to: 1) convert the optical input signal into an electrical signal; 2) determine which end device 930 to send the electrical signal to; 3) transmit the electrical signal to the appropriate end device 930; and 4) convert electrical input signals into optical signals for transmission to the umbilical termination 910. In the configuration of the communications system 900, determining which well tree 932A, 932B, 932C, through 932n to send the output electrical signal to is simplified as each routing unit 922A, 922B, 922C, through 922n is only connected to a single end device 930 by a corresponding electrical Ethernet connection 924A, 924B, 924C, through 924n.

With reference now to FIG. 6, a block diagram of a subsea communications system 1000 configuration wherein each well tree 1032A, 1032B, 1032C, through 1032n in the set of end devices 1030 is connected to an umbilical termination 1010 by a single routing unit 1020 is provided. The routing unit 1020 is redundantly connected to the umbilical termination by optical or electro-optical cables 1012 and 1013. The routing unit 1020 is then connected by corresponding electrical Ethernet connections 1022A, 1022B, 1022C, through 1022n to each well tree 1032A, 1032B, 1032C, though 1032n in the set of end devices 1032. An input optical signal from the umbilical termination 1010 is primarily sent through cable 1012; however, in the event cable 1012 fails, the secondary cable 1013 may be used instead. The routing unit 1020 converts the optical input signal into an electrical signal and determines which of the end devices 1030 to send the electrical signal to. The routing unit 1020 also handles return electrical signals from the end devices 1030.

With reference next to FIG. 7, a block diagram of a subsea communications system 1100 configuration wherein each well tree 1132A, 1132B, 1132C, through 1132n in the set of end devices 1130 is connected to an umbilical termination 1110 by both a first routing unit 1121 and second routing unit 1122 is provided. The first routing unit 1121 and second routing unit 1122 in the set of routing units 1120 is connected to the umbilical termination 1110 by optical or electro-optical cables 1112 and 1113 respectively. A plurality of electrical cables 1124A, 1124B, 1124C, through 1124*n* connects the first routing unit 1121 to each well tree 1132A, 1132B, 1132C, through 1132*n* in the set of end devices 1130. A plurality of electrical cables 1126A, 1126B, 1126C, through 1126*n* connects the second routing unit 1122 to each well tree 1132A, 1132B, 1132C, through 1132*n* in the set of end devices 1130. For example, electrical cable 1124A connects the first routing unit 1121 to the well tree 1132A. In this manner, the system 1100 is completely redundant wherein if either of the routing units 1120 fails, the other can handle communications to all end devices 1130 without additional intervention.

Other configurations are also possible. For example, each of the routing units 1120 may have a plurality of optical or electro-optical cable inputs. Additionally, configurations may be employed wherein the first routing unit 1121 is connected to a subset of the end devices 1130 and the second routing unit 1122 is connected to an other subset of the end devices 1130.

In any of the configurations shown in FIGS. 5-7, the routing unit or routing units effectively replace the subsea routing module 820 shown in FIG. 4. Each routing unit is simpler, smaller, and less expensive than a large routing module such as module 820. The routing units may have the capacity to perform some of the diagnostics and monitoring that the subsea routing module 820 is capable of performing, but in a preferred embodiment these functions are transferred to surface based equipment that may be more easily monitored and maintained.

Figure 8:
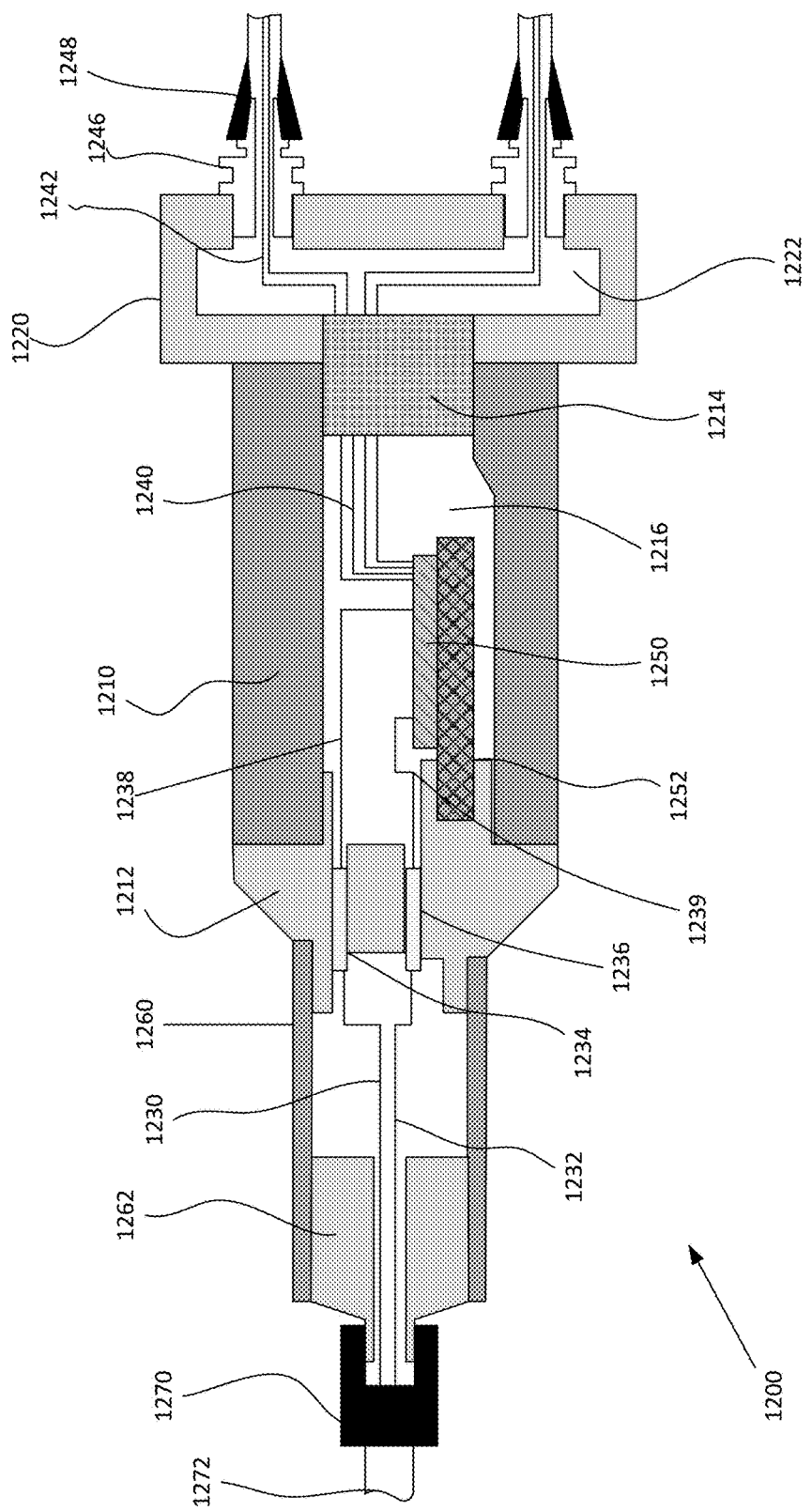
FIGS. 8 and 9 provide cross-section diagrams of a subsea routing unit in a flying lead housing according to the present invention.
Figure 9:
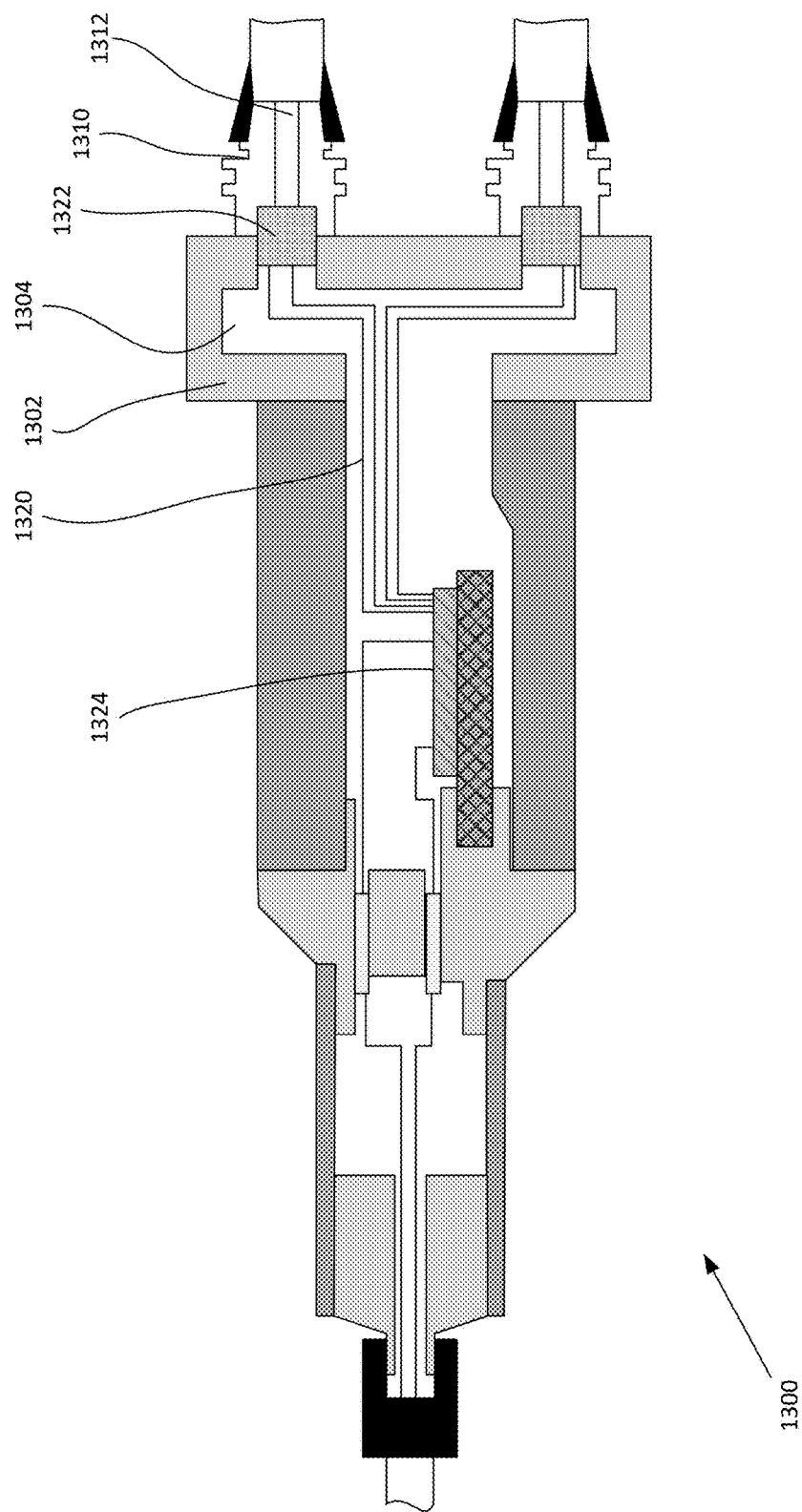

With reference now to FIGS. 8 and 9, cross section drawings of a flying lead routing unit 1200 and 1300 respectively are provided. The flying lead routing unit 1200 shown in FIG. 8 may be, for example, the flying lead harness 600 shown in FIG. 2. The flying lead routing unit 1200 comprises a main body 1210, an optical connection end 1260, and an electrical connection end 1220. The main body 1210 has at one end an end cap 1212 in which are disposed an electrical penetrator 1236 and an optical penetrator 1234. At the other end of the main body 1210 is disposed an electrical penetrator 1214. Within the main body is an atmospheric area 1216 in which a circuit board mounting plate 1252 and circuit board 1250 are disposed. At the optical connection end 1260 an optical cable termination 1270 of an electro-optical cable 1272 connects to the end cap 1262 and connects the flying lead routing unit 1200 to any suitable source device. Electrical cable 1232 and optical cable 1236 form operative connections between the electro optical cable 1272 and the electrical penetrator 1236 and optical penetrator 1234 respectively. Inside the atmospheric area 1216, electrical cable 1239 and optical cable 1238 connect to the circuit board 1250. The circuit board 1250 may be the board shown in FIG. 1.

From the board 1250 a plurality of electrical connections 1240, which may be copper Ethernet cables, form operative electrical connections between the board 1250 and the electrical penetrator 1214. At the electrical connection end 1220 an oil filled area 1222 is disposed within the electrical connection end 1220 and forms a pressure and particulate and/or fluid barrier between the cable termination connection 1246 and the electrical penetrator 1214. The electrical wires 1242 join the penetrator 1214 to the cable termination connection 1245. A cable termination 1248 connects to the cable termination connection 1246 and joins the flying lead routing unit 1200 to any suitable end device. The flying lead routing unit 1300 shown in FIG. 9 differs from the routing unit 1200 in FIG. 8 in that the atmospheric area 1304 extends within the electrical termination end 1302. Furthermore, instead of a single electrical penetrator 1214, a plurality of electrical penetrators 1322 are used. Additionally, each cable termination connection 1310 comprises an oil filled area 1312 within the cable termination connection. The wires 1320 connect the circuit board 1324 to each electrical penetrator 1322.

While the invention has been described by reference to certain preferred embodiments, it should be understood that numerous changes could be made within the spirit and scope of the inventive concept described. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A compact subsea Ethernet switching transmission system comprising:
    at least one subsea optical or electro-optical cable having first and second ends;
    a plurality of transmission cables;
    a source device;
    a plurality of end devices; and
    at least one subsea electro-optical routing unit having a first end connected to the first end of the optical or electro-optical cable and a second end connected to one end of at least one of the plurality of transmission cables, the subsea electro-optical routing unit having a compact subsea housing containing an atmospheric chamber and an Ethernet switching or routing device mounted in the atmospheric chamber;
    the Ethernet switching or routing device comprising:
    at least one optical input/output junction;
    a plurality of electrical input/output junctions;
    an Ethernet switching controller;
    a configuration micro-controller for configuring the Ethernet switching controller; and
    a multi-directional electrical/optical converter module operatively disposed between the optical input/output junction and the Ethernet switching controller, the converter module configured to convert optical input signals received at the optical input/output junction into electrical output signals at the Ethernet switching controller, and to convert electrical input signals received from the Ethernet switching controller into optical output signals at the optical input/output junction;
    one or more signal-carrying optical fibers extending from the first end of the optical or electro-optical cable into the atmospheric chamber of the first end of the optical or electro-optical routing unit and connected to the first junction of the multi-directional electrical/optical converter module, the optical or electro-optical cable releaseably connected to the subsea electro-optical routing unit; and
a plurality of electrical signal wires extending from the second junction and communicating with corresponding transmission electrical signal wires in the plurality of transmission cables via the Ethernet switching controller, the plurality of transmission cables releaseably connected to the subsea electro-optical routing unit.

2. The system of claim 1 wherein the source device is an umbilical termination and the plurality of end devices comprise at least one well tree.

3. The system of claim 1 wherein monitoring of the transmission system and of the source device and the plurality of end devices is performed by a set of surface based equipment.

4. The system of claim 1 wherein the housing is selected from the group consisting of a flying lead housing and a modular connectorized distribution unit housing.

5. The system of claim 1 wherein the housing further comprises an oil filled chamber separated from the atmospheric chamber by a set of penetrators.

6. The system of claim 1 wherein the subsea electro-optical routing unit is disposed between and is in operative electrical communication with the at least one subsea optical or electro-optical cable and the plurality of transmission cables.

7. The system of claim 1 wherein the second end of the optical or electro-optical cable is releaseably connected to the source device, and wherein each of the plurality of transmission cables are releaseably and operatively connected an end device from the plurality of end devices.

8. A compact subsea Ethernet switching transmission apparatus comprising:
at least one subsea optical or electro-optical cable having first and second ends;
a plurality of transmission cables; and
at least one subsea electro-optical routing unit having a first end connected to the first end of the optical or electro-optical cable and a second end connected to one end of at least one of the plurality of transmission cables, the subsea electro-optical routing unit having a compact subsea housing containing an atmospheric chamber and an Ethernet switching or routing device mounted in the atmospheric chamber;
the Ethernet switching or routing device comprising:
at least one optical input/output junction;
a plurality of electrical input/output junctions;
an Ethernet switching controller;
a configuration micro-controller for configuring the Ethernet switching controller; and
a multi-directional electrical/optical converter module operatively disposed between the optical input/output junction and the Ethernet switching controller, the converter module configured to convert optical input signals received at the optical input/output junction into electrical output signals at the Ethernet switching controller, and to convert electrical input signals received from the Ethernet switching controller into optical output signals at the optical input/output junction;
one or more signal-carrying optical fibers extending from the first end of the optical or electro-optical cable into the atmospheric chamber of the first end of the subsea electro-optical routing unit and connected to the first junction of the multi-directional electrical/optical converter module, the optical or electro-optical cable releaseably connected to the subsea electro-optical routing unit; and
a plurality of electrical signal wires extending from the second junction and communicating with corresponding transmission electrical signal wires in the plurality of transmission cables, the plurality of transmission cables releaseably connected to the subsea electro-optical routing unit.

9. The apparatus of claim 8 further adapted to connect to a source device and a plurality of end devices.

10. The apparatus of claim 9 wherein the source device is an umbilical termination and the plurality of end devices comprise at least one well tree.

11. The apparatus of claim 9 wherein the apparatus is adapted to monitor a subsea Ethernet transmission system, the source device, and the plurality of end devices.

12. The apparatus of claim 9 wherein monitoring of the transmission system, the source device, and the plurality of end devices is performed by a set of surface based equipment.

13. The apparatus of claim 8 wherein the housing is selected from the group consisting of a flying lead housing and a modular connectorized distribution unit housing.

14. The apparatus of claim 8 wherein the housing further comprises an oil filled chamber separated from the atmospheric chamber by a set of penetrators.

15. The apparatus of claim 8 wherein the subsea electro-optical routing unit is disposed between and is in operative electrical communication with the at least one subsea optical or electro-optical cable and the plurality of transmission cables.

16. A method for subsea electro-optical Ethernet transmission between a source device and a plurality of end devices, the method comprising:
releaseably connecting a first end of an optical or electro-optical cable to the source device;
releaseably connecting a second end of the optical or electro-optical cable to an optical or electro-optical input/output port on a subsea electro-optical routing unit;
releaseably connecting a first end of an electrical Ethernet cable to one of a plurality of electrical Ethernet input/output ports on the subsea electro-optical routing unit;
releaseably connecting a second end of the electrical Ethernet cable to an end device;
configuring an Ethernet switching controller disposed in the electro-optical routing unit by a configuration micro-controller;
communicating a first optical signal from the source device to the optical input/output port of the electro-optical routing unit;
converting, by an electrical/optical converter module, the first optical signal into a first electrical signal;
communicating the first electrical signal from the electrical/optical converter module to the Ethernet switching controller;
determining which of the plurality of electrical Ethernet input/output ports to communicate the first electrical signal to based on a current configuration of the Ethernet switching module;
transmitting the first electrical signal to the end device by the electrical Ethernet cable connected to the determined electrical Ethernet input/output port;
communicating a second electrical signal from the end device to an electrical Ethernet input/output port of the electro-optical routing unit by the electrical Ethernet cable connected to the electrical Ethernet input/output port;
determining which of the plurality of electrical Ethernet input/output ports received the second electrical signal based on a current configuration of the Ethernet switching module and appending a set of source information to the second electrical signal;

communicating the second electrical signal from the Ethernet switching controller to the electrical/optical converter module;

converting, by the electrical/optical converter module, the second electrical signal into a second optical signal; and transmitting the optical signal to the source device by the optical or electro-optical cable.

17. The method of claim 16 wherein the source device is an umbilical termination and the plurality of end devices comprise at least one well tree.

18. The method of claim 16 further comprising monitoring, by the subsea electro-optical routing unit, a subsea Ethernet transmission system, the source device, and the plurality of end devices.

19. The method of claim 16 wherein the monitoring of the transmission system, the source device, and the plurality of end devices is performed by a set of surface based equipment.

20. The method of claim 16 wherein the subsea electro-optical routing unit comprises a housing selected from the group consisting of a flying lead housing and a modular connectorized distribution unit housing.

21. The method of claim 16 wherein the housing further comprises an oil filled chamber separated from the atmospheric chamber by a set of penetrators.

* * * * *